B. M. BROOKE.
SCALE.
APPLICATION FILED MAR. 13, 1911.

1,009,826.

Patented Nov. 28, 1911.

2 SHEETS—SHEET 1.

Witnesses

Inventor
Banner M. Brooke
By C. C. Shepherd
Attorney

UNITED STATES PATENT OFFICE.

BANNER M. BROOKE, OF COLUMBUS, OHIO.

SCALE.

1,009,826.  Specification of Letters Patent.  Patented Nov. 28, 1911.

Application filed March 13, 1911. Serial No. 614,124.

*To all whom it may concern:*

Be it known that I, BANNER M. BROOKE, a citizen of the United States, residing at Columbus, in the county of Franklin and State of Ohio, have invented certain new and useful Improvements in Scales, of which the following is a specification.

This invention relates to scales of the beam type and is particularly designed to obviate existing draw-backs and difficulties coincident to automatically weighing loads of greater magnitude, for instance loads exceeding one-thousand pounds. It has been found through practical use that such scales for automatically weighing heavy loads, being necessarily provided with a multiplicity of springs, pinions, segments, etc., do not maintain the requisite degree of accuracy for any considerable length of service.

The object of my invention is to provide quick indication of weights up to the full capacity of the scales by using an automatic or quick weighing device for a portion of the load and additional multiples of that amount by the use of auxiliary or counterpoise weights applied to the counterpoise stem one at a time as the load to be weighed may require, thus giving quickly and practically automatically the weight up to the full capacity of the scales without encumbering the action of the scales with springs, cams, pinions, or extra levers, thus leaving the action at all times free.

In the preferred embodiment of this invention, there are utilized a pluralty of auxiliary weight beams which are normally maintained in ineffective relation to the scale beam, but which may be successively permitted to move into effective position by the utilization of a series of cam structures normally maintaining said weight beams in effective position.

Figure 1:
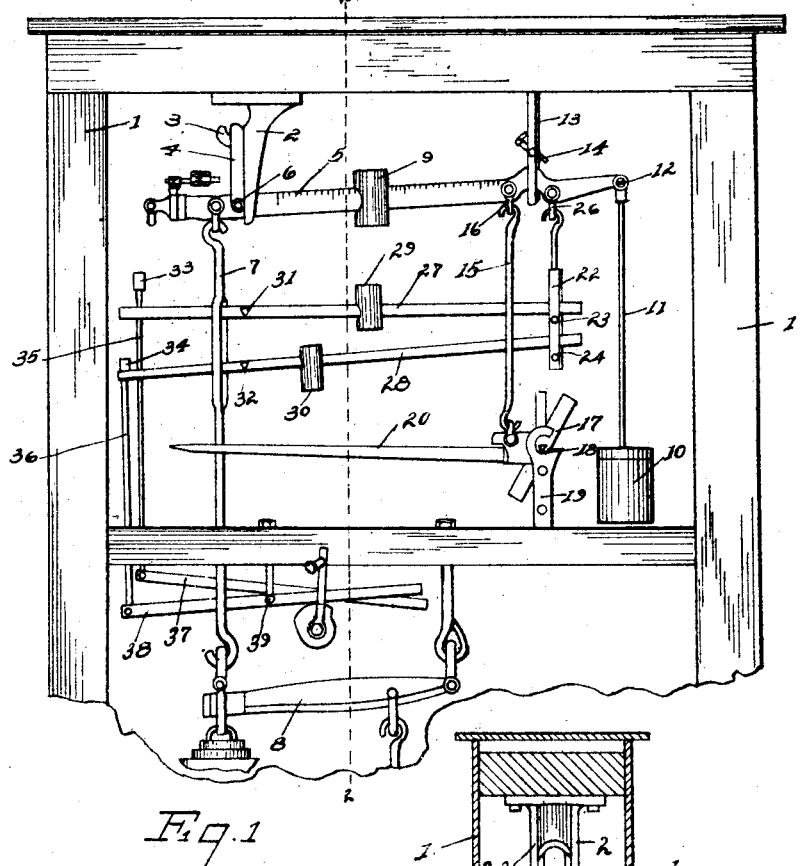
Figure 2:
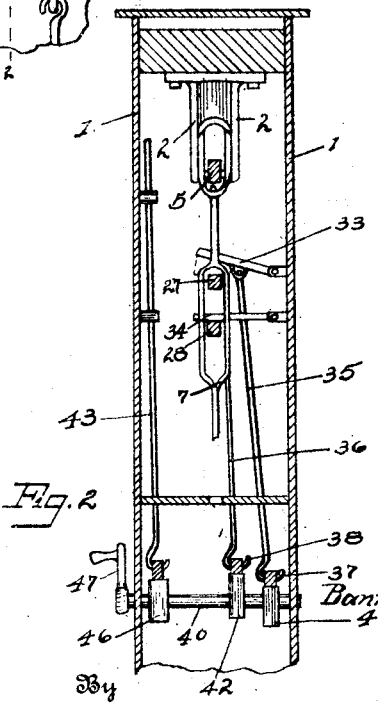
Figure 3:
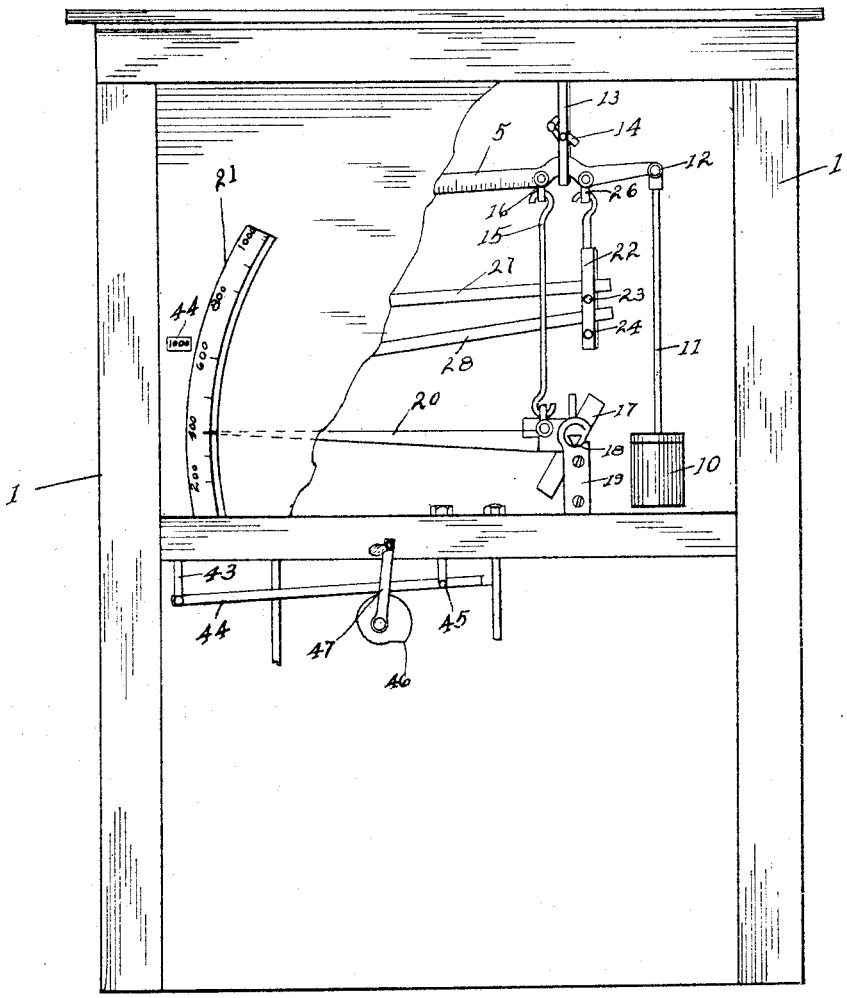

In the form which my invention takes in the specific showing thereof in the drawings: Figure 1 is a section in elevation showing the major part of the scale box with its face removed to show the operating mechanism utilized in the accomplishment of my purpose, Fig. 2 is a vertical transverse section on line 2—2 of Fig. 1, and, Fig. 3 is a front elevation of the scale box with its face partly broken away.

Referring specifically to the drawings, in the views of which similar characters of reference designate corresponding parts, the scale box is designated 1 and is provided at its upper inner face with a depending bifurcated hanger 2 having an integral hook 3 formed thereon for the support of a U-shaped link 4 to the extremities of the depending legs of which is pivoted a scale beam of normal form designated 5 as at 6. This scale beam is of the usual structure and is provided on its heavier end, as is customary, with a depending link 7 connected to the customary balancing structure 8 which may be of any preferred form. This beam is also provided with an adjustable sliding weight as is customary, which weight is shown at 9. There is likewise provided a dash pot structure 10 having its plunger 11 connected to the free end of the beam as at 12, to compensate for the vibration of the pendulum and beam. There is also provided the usual depending embracing strap member 13 with the pivoted locking piece 14, which embracing strap embraces the beam near its free end.

I preferably connect to the beam 5 to the left of the embracing strap 13 a loop link 15 by means of a link 16. This loop link 15 is hooked at its lower end to a piece 17 of substantially T form supported by knife bearings 18 in a casting 19. Extending from the shank of this piece 17 is an elongated pointer 20 adapted to move upon the swinging of the piece 17 in the direction of an arc. In coöperative relation with the end of this pointer 20, I provide a scale surface 21 of arcuate contour and capable of measuring smaller weights.

In effecting the full purposes of my invention, there is provided an auxiliary mechanism comprising a ladder-link 22 having a plurality of rungs such as 23 and 24 and supported from the scale beam 5 by a link 26. Extending into said ladder link 22, I preferably utilize weight beams 27 and 28 which are disposed respectively above the rungs 23 and 24 and which are provided with adjustable weights 29 and 30, it being understood that the said weight beams 27 and 28 are pivoted near one end as at 31 and 32, inasmuch as the weights 29 and 30 are disposed upon the beams 27 and 28 between their pivotal points and the ladder 22, it will be apparent that these ends of the beams 27 and 28 are the heavy ends and unless restrained, would tend to bear respectively upon the rungs 23 and 24. However, the light ends of the beams 27 and 28 have superposed thereover latch members 33 and 34 preferably pivoted to the side of the scale box and connected respectively to pole rods 35 and 36 which are hooked at their lower ends to levers 37 and 38 pivoted at a point intermediate of their ends as at 39.

Extending transversely through the scale box beneath the free ends of the levers 37 and 38 is provided a shaft 40 carrying three cams. Two of these cams are designated 41 and 42 and are continually in contact with the levers 37 and 38 respectively. However, these cams are so positioned that a rotation of the shaft will bring said cams successively into position to raise the free ends of the levers 37 and 38 and it is in this position that they are normally maintained, it being apparent that a reverse movement of the shaft in a rotary direction will successively release the free ends of said levers 37 and 38 and permit them to drop. Attention is directed to Fig. 1 in which the pole rod 35 is shown to be at its uppermost position and the pole rod 36 is shown to be at its lowermost position, these rods 35 and 36 respectively serving to permit the arms 33 and 34 to release and depress the weight beams with regard to which they are superposed.

In conjunction with the operating mechanism for the weight beams, I utilize a vertically sliding scale carried by the rod 43 and having spaced indications thereon which are capable of exposure through an opening 44 in the face of the casing. Connected to this rod 43 is provided a lever 44 pivoted at its opposite end at 45 and normally resting upon a continuous cam 46 likewise which is the cam hitherto mentioned as being mounted upon the shaft 40. A handle 47 is provided for the shaft 40.

In operation, if it is desired to weigh a load exceeding one-thousand pounds and not exceeding two-thousand pounds, the shaft 40 is rotated by its handle until the free end of the lever 37 is permitted to fall, which releases the arm 33 through the medium of the rod 35 and permits the light end of the weight beam 27 to rise, thus dropping the heavy end of the said weight beam 27 on to the rung 23. This heavy end of the weight beam may be so weighted as to require the application of at least an additional thousand pounds to the scale to raise the main beam. If this is done, the cam 46 is made of proper contour to raise the lever 44 to such an extent as to cause the number 1000 upon the slide 43 to appear back of the opening 44 and to be legibly discernible therethrough. It will then be apparent that the first thousand pounds is compensated for by the weight of the weight beam and that any subsequent or additional weight is shown upon the arcuate scale surface 21 by the pointer 20. If it is desired to increase the weighing capacity of the scale another thousand pounds, the handle 47 is further rotated to release the free end of the lever 38, throwing the weight beam 28 on to the rung 24 and simultaneously moving the slide upon the rod 43 until the number 2000 appears behind the aperture 44. From then on, additional weight is shown upon the arcuate scale 21 by the pointer 20, it of course being understood that the actual weight is determined by the combined readings of the two indicators. In this manner it will be understood that I have provided a quick weighing scale structure comprising a minimum number of parts and capable of a maximum rapidity and accuracy of action, which I believe to be novel in the art.

What I claim, is—

1. In combination with a beam scale having a quick weighing indicator, auxiliary weight beams for effecting increase of the range of indication in determinate degrees, latches adapted to bear on the light ends of said beams, levers connected to said latches, and a cam for maintaining each of said levers in position to cause its latch to hold a weight beam ineffective, and means for successively moving said cams to ineffective position.

2. In combination with a beam scale having a quick weighing indicator, auxiliary weight beams for effecting increase of the range of indication in determinate degrees, latches adapted to bear on the light ends of said beams, levers connected to said latches, and a cam for maintaining each of said levers in position to cause its latch to hold a weight beam ineffective, means for successively moving said cams to ineffective position, an indicator for indicating the resultant successive increase of load, and a cam controlling said indicator simultaneously with the movement of said cams to ineffective position.

3. In combination with a beam having a quick weighing indicator, auxiliary weight beams for effecting increase of the range of indication in determinate degrees, pivoted arms adapted to bear upon the light ends of said weight beams, pull rods for said arms, levers for said pull rods, an indicating slide, a lever for moving said slide, a rotating shaft, and cams on said shaft individually coöperating with said levers and so positioned as to render the weight beams successively effective and simultaneously operating said slide.

In testimony whereof I affix my signature in presence of two witnesses.

BANNER M. BROOKE.

Witnesses:
C. C. SHEPHERD,
JOHN H. EAGLESON.